May 31, 1932.  W. H. SOMMER  1,861,145
TRUCK
Filed July 19, 1930   5 Sheets-Sheet 1
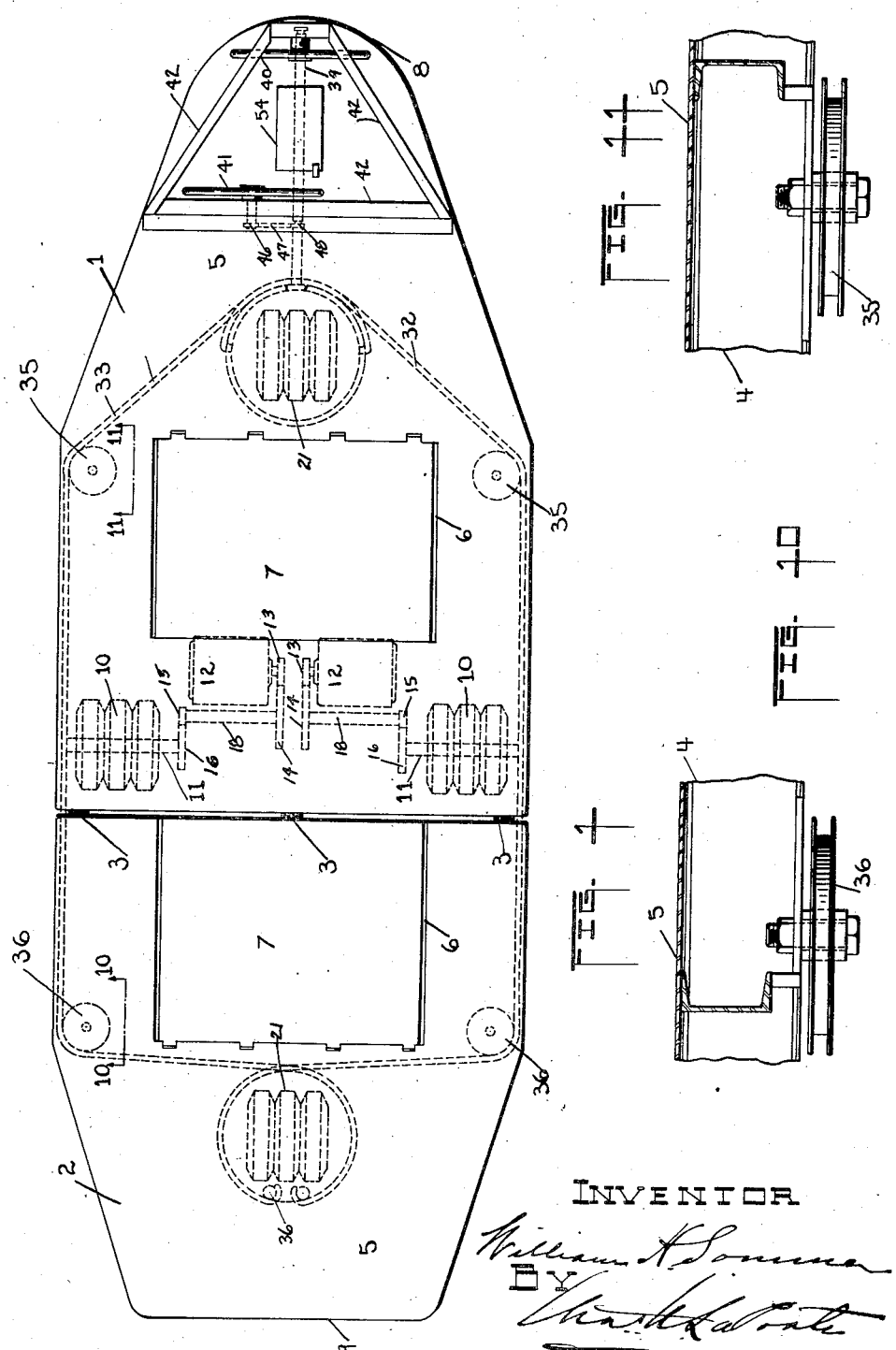
INVENTOR
William H Sommer
BY
Atty May 31, 1932. W. H. SOMMER 1,861,145
TRUCK
Filed July 19, 1930 5 Sheets-Sheet 2
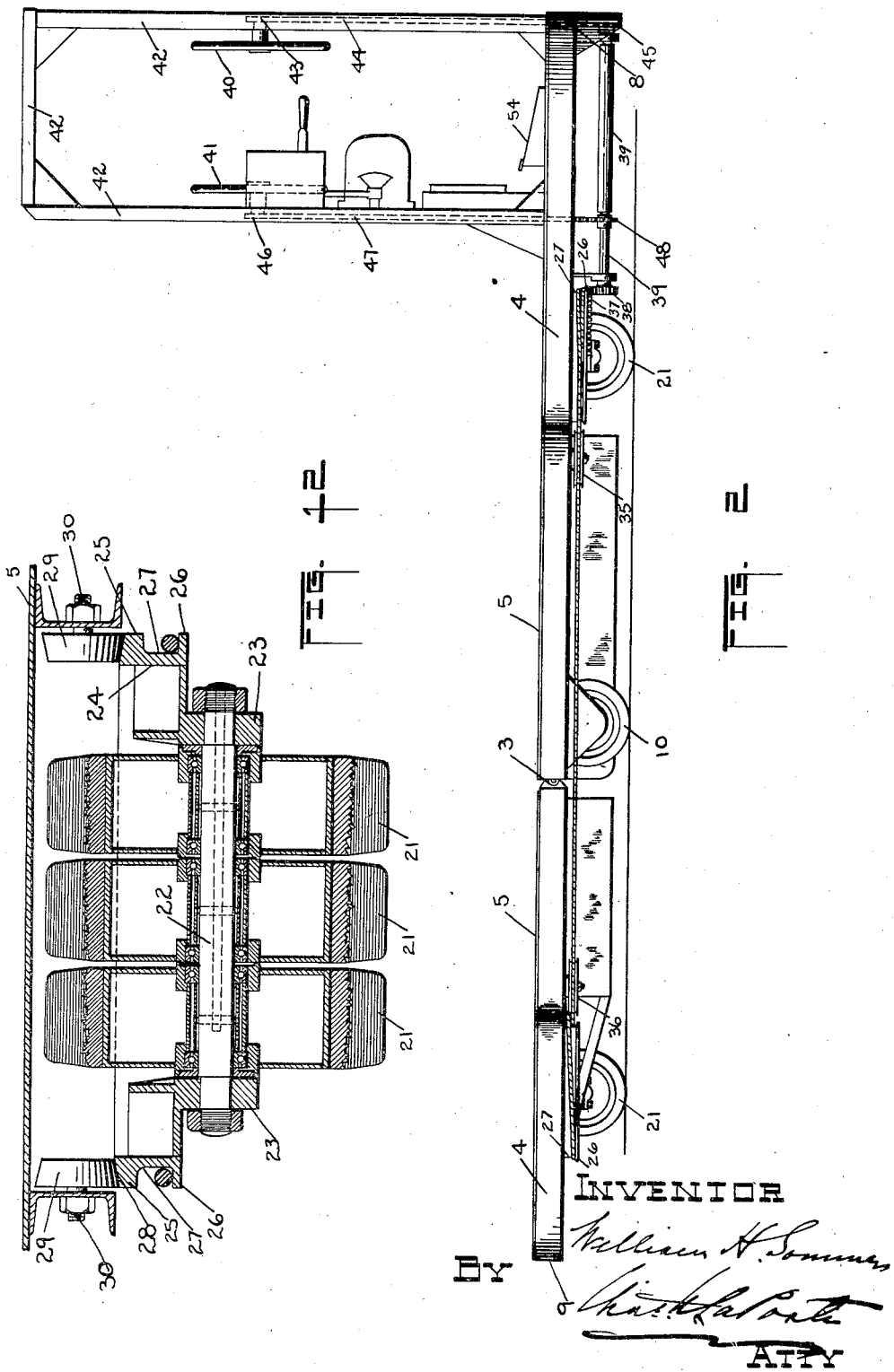

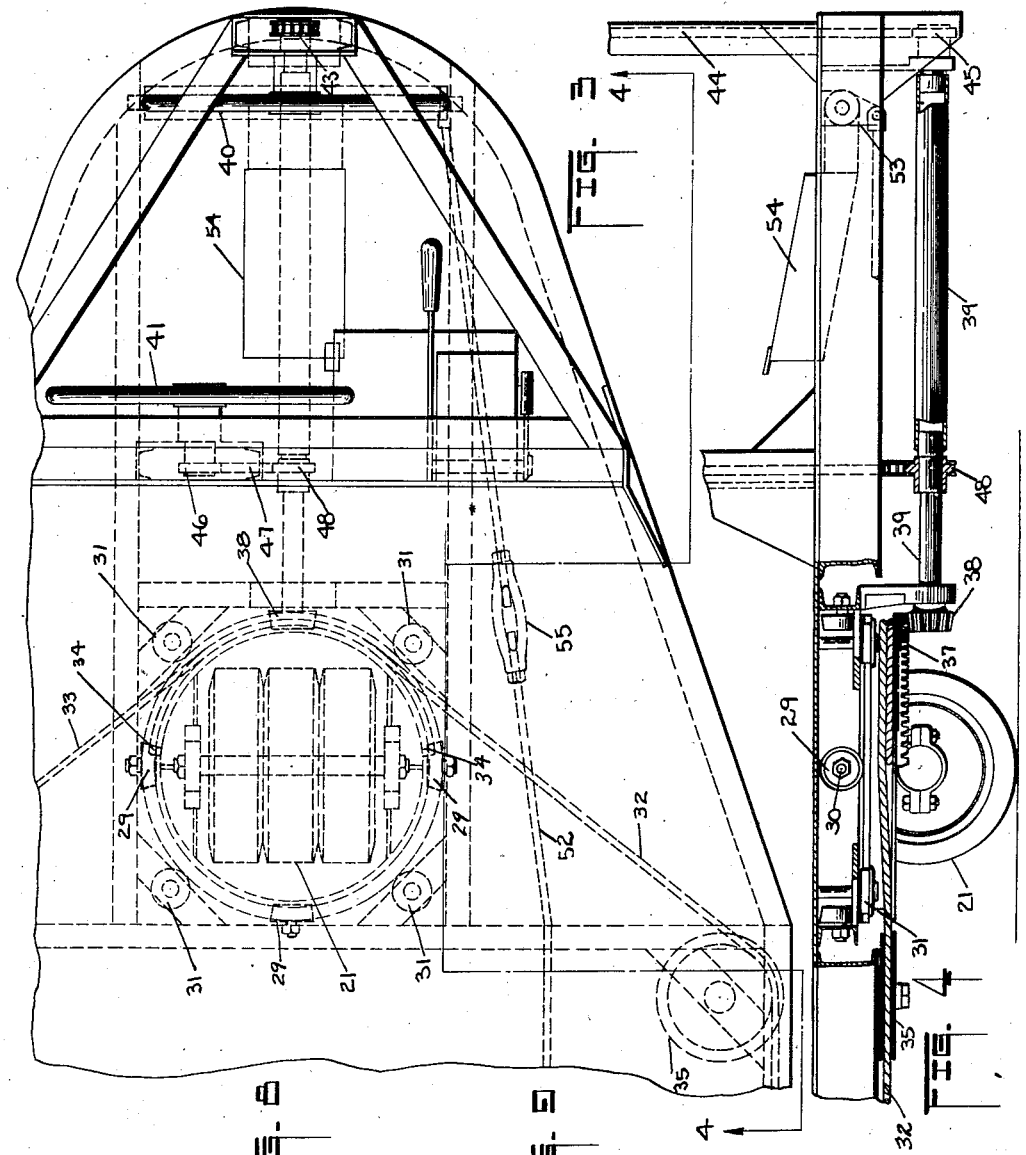
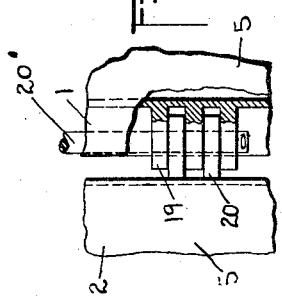
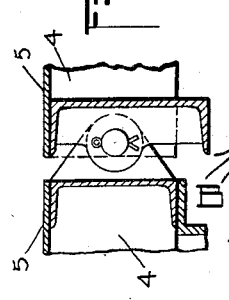

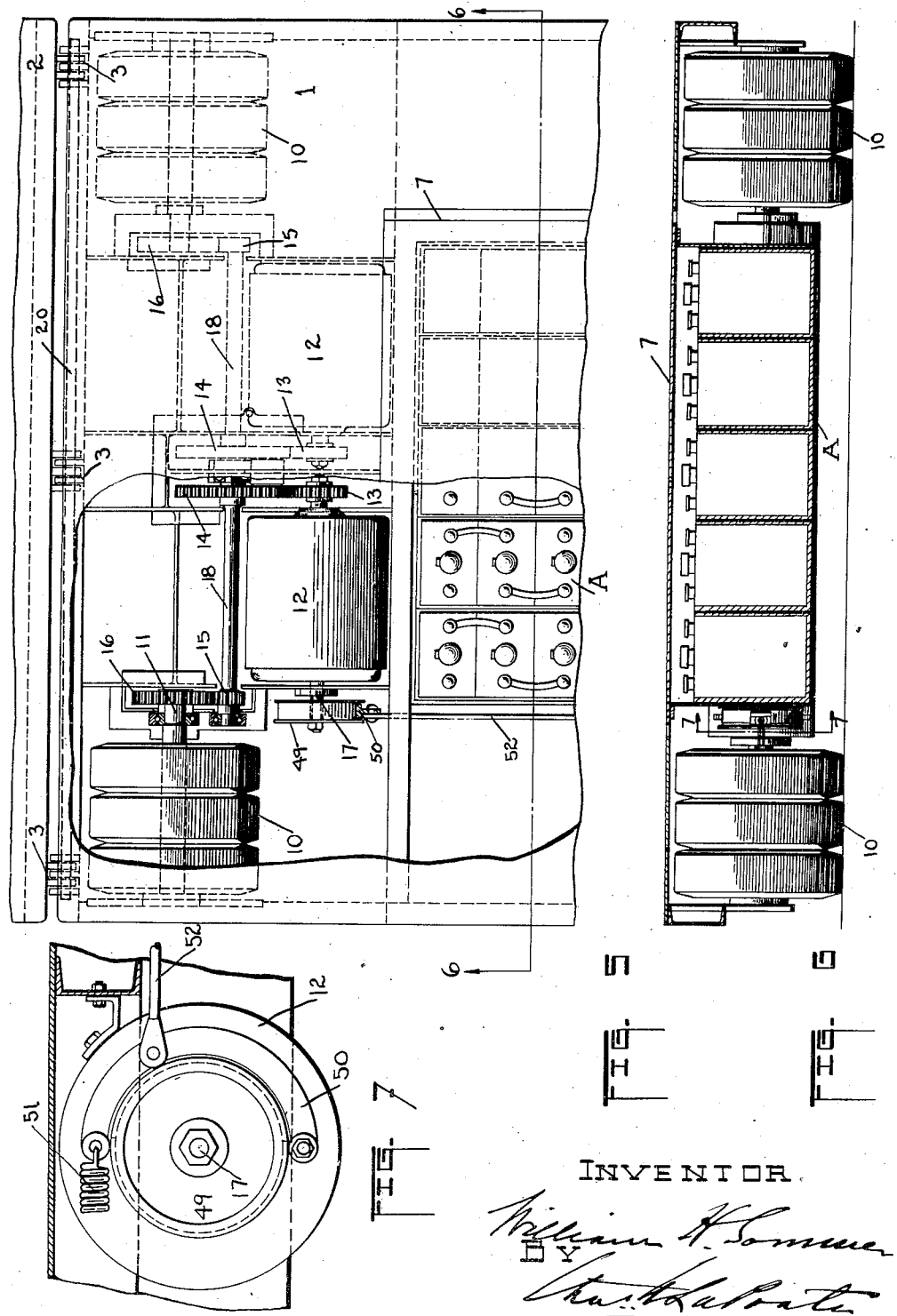

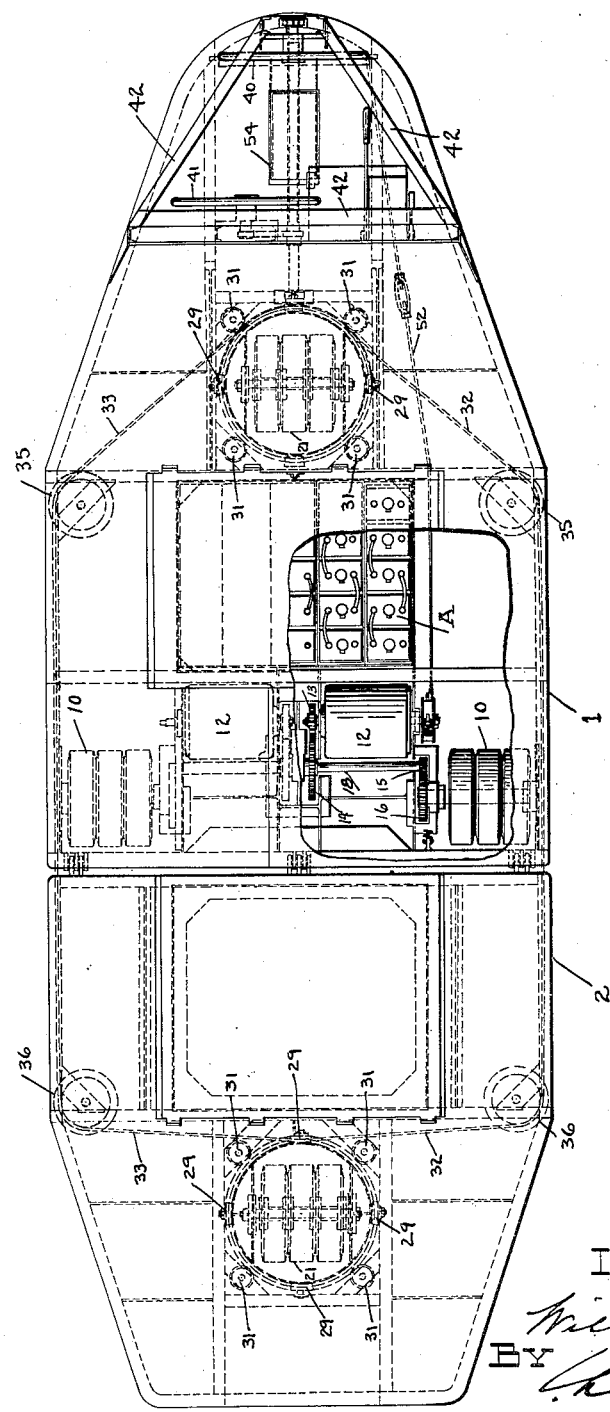

Patented May 31, 1932

1,861,145

UNITED STATES PATENT OFFICE

WILLIAM H. SOMMER, OF PEORIA, ILLINOIS

TRUCK

Application filed July 19, 1930. Serial No. 469,067.

This invention has reference to trucks and particularly to the power operated type, and to such as are adapted for use in and about warehouses.

The invention has for its principal object to provide a truck which possesses advantages for use in handling heavy materials and therefore, this truck has first—a low center of gravity making it convenient for placing and removing materials; second the truck is constructed in two sections, a propelling and a trailing section, the two sections being flexibly connected; third the said sections are each provided with a wheel and steering couplings therebetween whereby the truck may be turned on a very short radius, and fourth the propelling section is provided with a double set of steering wheels with connections to the said wheel of the propelling section whereby the driver can face in the direction of travel, whether going forward or backward, and steer while facing in such direction.

The invention has for a further object to provide a truck of flexibly coupled sections having a very low center of gravity, the front section having propelling means comprising a pair of motors and a traction wheel geared to each of said motors, thereby obviating the requirement of a differential means between the set of traction wheels, and each section being provided with a wheel and steering couplings therebetween.

A further object of the invention is to provide a brake means in connection with the propelling means; said brake means being normally set and releasable through the actuation of a brake release pedal operative by the driver through pressure of a foot thereon and said brake means automatically operative on the release of the brake pedal.

A still further object of the invention is to construct the truck of two sections flexibly connected, the free end portions of the said truck sections having side portions which converge inwardly toward the ends of the sections, whereby abutment with and entrance through doors of warehouses may be accomplished with considerable freedom and ease on approach from different angles.

Other and further objects will more fully appear from the following description.

That the invention may be more fully understood, reference is had to the accompanying drawings forming part of the description, illustrating a preferred embodiment of the invention, in which:—

Fig. 1 is a plan view illustrating in outline the general configuration of the truck, the dotted lines showing the propelling means, also the steering means whereby the truck may be turned on a short radius;

Fig. 2 is a side elevation of the truck;

Fig. 3 is a detail in plan of a part of the front end of the propelling section of the truck, showing in better outline the component parts thereof;

Fig. 4 is a side elevation, partly in section, as the same would appear if taken on the line 4—4 Fig. 3;

Fig. 5 is a detail, in plan, of the rear and front coupled ends of the two sections, and showing in full and dotted lines a propelling means carried by the front section;

Fig. 6 is a cross-section, in elevation, as the same would appear if taken on the line 6—6 Fig. 5;

Fig. 7 is a view, in elevation, and partly in section, of the brake means;

Fig. 8 is a detail, in plan and in section, showing the flexible connection between the two said sections;

Fig. 9 is an elevation, in section, of the connection of Fig. 8;

Fig. 10 is a detail, partly in section, of the frame and idler wheel construction as the same would appear if taken on the line 10—10 Fig. 1;

Fig. 11 is a view similar to Fig. 10, except as the same would appear if taken on the line 11—11 Fig. 1;

Fig. 12 is a detail, in section, showing a guiding wheel for one of the sections and the mounting therefor, and Fig. 13 is a general diagrammatic outline of the truck, partly broken away to disclose certain parts and dotted lines employed to illustrate frame and operative parts.

Like characters of reference denote corresponding parts throughout the figures.

The drawings disclose the truck as being preferably constructed of two sections, or divided into two parts, the propelling section 1 and the trailing section 2 which are flexibly connected at 3, and except for the section 1 being somewhat longer than the section 2 their frame structures are along the same general lines. That is, they are each made up of side frames 4, preferably channel beams which have the contour of the outlines of the said sections and each said section has a floor plate 5, which at suitable points are cut out or cut away, at 6, and there-beneath are suitably supported storage batteries A, one for each section, whereby to more or less evenly distribute the weight of such batteries on the truck and hinged cover plates 7 are provided to close the cut out or cut away portions 6 and to provide a means permitting access to be had to the said batteries. The side channels 4 of the said sections 1 and 2 may be of one piece or of several pieces welded and are preferably shaped to provide parallel sides for the truck throughout a portion of the sections and for the front end of the section 1 the channels converge toward each other, as shown, and meet in a rounded end portion 8; whereas, the side channels of the section 2 also converge in the direction of each other toward their rear end and the rear end of such section is preferably squared, as at 9. With such a construction of front and rear end of the truck warehouse doors may not only be approached directly from in front thereof but such approach may be from different angles and since many, if not all such doors, are provided with buffers or shock absorbers, it is readily seen that the truck may be conveniently and easily handled when approaching and opening any such doors but also the passage of the truck through door openings is easily facilitated.

To propel the truck, I provide the section 1 with, preferably a set or pair of spaced and axially aligned traction wheels 10, 10, carried by axles or shafts 11 journaled in suitable bearings on the frame. For each traction wheel there is an electric motor 12 in suitable communication with the batteries providing the source of power, and each motor is geared to its respective traction wheel 10 through a train of gears 13, 14, 15 and 16. The gear 13 on the motor shaft 17 is in mesh with the gear 14 which is carried on an interposed shaft 18, which also carries the gear 15 meshing with the gear 16. The motors, as well as other operating parts described, are each and all suitably supported and have adaptable journal bearings on the truck frame, as of course is understood. By providing two motors, one each geared to a traction wheel the use of a differential is eliminated. There is employed, as I described a brake means in connection with one of the motors, although such a means in connection with both motors could and may be employed, if necessary or desirable.

The coupling means which provides a flexible connection between the two said sections 1 and 2 is best seen in Figs. 8 and 9, wherein the meeting ends of the two said sections are provided at suitable points with complementary ears 19 and 20, respectively, through which a hinge or coupling rod 20' is inserted.

Each section is provided with a wheel 21 which constitute elements in the steering mechanism for the truck and together with the wheels 10 provide the supporting and mobile means by which the truck is moved from one place to another. Said wheels 21 are disposed centrally of the width of the truck, as will be seen and the manner of mounting these wheels is best seen in Figs. 1, 2 and 4. As both said wheels are substantially alike in structure, the detailed description of one will suffice for both. By reference to Figs. 3, 4 and 12 it will be seen that the wheel 21 is carried and has a ball bearing connection with a shaft 22 which is journaled in bearings 23 depending from a ring 24 the periphery of which is formed or provided with flanges 25 and 26 providing therebetween the channel or groove 27. The upper surface of the flange 25 is tapered or inclined downwardly and outwardly, as at 28 to provide a bearing surface against which the pairs of diametrically opposed beveled wheels 29 bear and ride and said wheels 29 are carried by short spindles 30 secured in suitable frame parts of the truck, see Figs. 3 and 12, and engaging the flange 26, at points between the wheels 29 are grooved wheels 31 journaled on suitable frame supports, see Figs. 3 and 4. Such an arrangement provides a roller bearing support for the rings 24 whereby to permit turning of the wheels 21, under the control of the driver of the truck and whereby the truck may be turned on a very short radius. The rings 24 are connected by cables 32 and 33. The cable 32 connected at the point 34 to the ring 24 and passing through and part way round the groove or channel 27, is directed rearwardly to the side of the truck, over an idler wheel 35, thence along the channel frame 4 from the section 1 to the section 2, thence over an idler wheel 36 and inwardly to and part way around the groove of the ring 24 of the wheel 21 of the section 2 and secured at the point 36 to said ring, see Fig. 1. The cable 33 is disposed oppositely to the cable 32, see Fig. 1, and being so disposed it is obvious that if the wheel 21 of the propelling section 1 is turned in one direction that the wheel 21 of the trailing section 2 will be turned in an opposite direction and thus a short radius turning of the truck is accomplished. The mountings for the idler wheels for guiding the two cables 32 and 33 are in or on suitable frame parts of the truck. The ring 24 for the propelling section, is provided for a part of its circumference with a depending rack or toothed segment 37, see Fig. 4 and in mesh with said rack or segment is a bevel gear wheel 38 carried on the inner end of a longitudinally disposed operating shaft 39 having a journal bearing in suitable frame supports beneath section 1 of the truck.

To actuate the shaft 39 I provide a double set of steering wheels 40 and 41 located well up in a cab 42, mounted on and extending up from the front end of the section 1, see Fig. 2. The steering wheel 40 is operatively connected with a sprocket wheel 43 adapted to operate a sprocket chain 44 which passes down to and has operative connection with a sprocket wheel 45 on the forward end of the shaft 39. The steering wheel 41 is operatively connected with a sprocket wheel 46 adapted to operate a sprocket chain 47 which passes down to and has operative connection with a sprocket wheel 48 on the shaft 39 mediate its length, see Fig. 4. The cab 42 is of skeleton structure so that a driver standing on section 1 and within the cab may face either front or rear and therefore look forward or backward and observe where he is going, driving either forwardly or backwardly and when driving in either direction, be able to steer the truck.

There are provided electrical appliances for controlling the starting and stoppage of the motors 12 and an outline of elements in this control are shown in Figs. 2 and 3, but since no claim is made, in this application, to such devices or mechanism no detail disclosure is made thereof, either in the drawings or description. However, there is provided a brake means under the control of the driver, which said means is normally set and is releasable at the will of the driver, as I shall now explain.

Connected preferably with a shaft 17 of one of the motors 12 is a drum 49 and adapted to coact with said drum is a pivoted brake shoe 50, see Figs. 5, 6 and 7. This shoe is normally held set against the drum by means of a sufficiently powerful spring 51, connected one end to the free end of the shoe and having its opposite end connected to a suitable frame part of the truck. Also connected to said shoe is a rod 52, which extends forwardly of the truck and has its front end connected to a crank arm 53 which is in operative connection with a brake release pedal 54 having a hinge connection in the floor plate 5 of the cab of the truck, see Figs. 3 and 4. It should be obvious, therefore, that the driver to start the truck must first apply pressure to the pedal 54 which will in turn, through the connections described, release the brake shoe 50, and on releasing the pedal the spring 51 will act to set the brake and stop the truck. While I have shown a brake applied to only one of the motors, it is to be understood that if it should be necessary or desirable a brake may be applied to the other motor. There is provided a coupling 55, in the form of a turn buckle, which may or may not be incorporated in the length of the rod 52 for adjusting said rod.

What I claim is:—

1. A warehouse truck having a low center of gravity and comprising two sections of unequal length flexibly coupled in close relationship whereby to provide a substantially continuous material supporting surface, the longer section including the propelling and steering means and the shorter section being the trailing section, aligned supporting and propelling wheels located approximately centrally of the length of the truck and below the inner end of said longer section, a supporting and steering wheel below the outer end of each section and aligned centrally longitudinally of the truck, flexible steering connections between said last mentioned wheels, and means located on the longer section for actuating said steering connections, said actuating means including dual elements whereby an operator may handle the truck when facing in opposite directions.

2. A warehouse truck including a pair of sections flexibly coupled and having substantially continuous load supporting surfaces, alined traction wheels disposed beneath the load supporting surfaces and approximately central of the length of the truck and adjacent the inner end of one of the sections, a central traction wheel beneath the load supporting surfaces and adjacent the outer end of each section which latter wheels are alined longitudinally of the truck, steering means connecting said last named wheels, and a pair of actuating means mounted on one of the sections adjacent an end thereof and each connected to the steering means and facing in opposite directions toward the respective opposite ends of the truck, said actuating means being substantially closely spaced and affording room for an operator in such space whereby the operator may by reversal of his position selectively face in opposite directions thereby to confront either of the actuating means to accordingly operate the truck.

3. A warehouse truck including a body having a substantially continuous load supporting surface, traction wheels connected to the body, steering means for the wheels, and a pair of actuating means mounted on the body adjacent an end thereof and each connected to the steering means and facing in opposite directions toward the respective opposite ends of the truck, said actuating means being substantially closely spaced and affording room for an operator in such space whereby the operator may by reversal of his position selectively face in opposite directions thereby to confront either of the actuating means to accordingly operate the truck.

4. A warehouse truck including a pair of sections each having a floor, the floors being alined to afford a substantially continuous load supporting surface, and each floor provided with an opening, means to flexibly couple the sections, traction wheels carried by one of the sections beneath the floor thereof, a motor carried by said one section beneath the floor thereof for driving the traction wheels, a plurality of storage batteries constituting a set carried by each section and connected to the motor and located below and in register with the respective floor openings of the sections, and covers for the floor openings, said two sets of batteries being spaced relative to each other and to the ends of the truck so as to substantially uniformly distribute the weight of the two sets relative to the overall length of the truck.

5. A warehouse truck including a pair of sections flexibly coupled and having a substantially continuous load supporting surface, traction wheels carried by one of the sections beneath the load supporting surface, a motor carried by said one section beneath the load supporting surface for driving the traction wheels, and a multiplicity of storage batteries each constituting a set carried by each section and located beneath the load supporting surface and connected to the motor, said two sets of batteries being spaced relative to each other and to the ends of the truck so as to substantially uniformly distribute the weight of the two sets relative to the overall length of the truck.

6. A warehouse truck including a long propelling section and a short trailer section flexibly coupled thereto, said sections having substantially continuous load supporting surfaces, alined traction wheels beneath the propelling section and adjacent the inner end thereof and located in the space between the sides of the propelling section, a central traction wheel beneath the load supporting surface of each section, steering means connecting the last named wheels, driving means carried by the propelling section and including a motor connected to the first named traction wheels to drive the same and disposed adjacent thereto, an operator's cab located at the outer end of the propelling section in counterbalancing relation to the said driving means, and a set of storage batteries carried by each section and connected to the motor, the set carried by the trailer section being located adjacent the inner end thereof and the set carried by the propelling section being located between the driving means and the operator's cab in counterbalancing relation to the set carried by the trailer section.

WILLIAM H. SOMMER.